C. KUGLER.
Horse Rake.
No. 57,520. Patented Aug. 28, 1866.
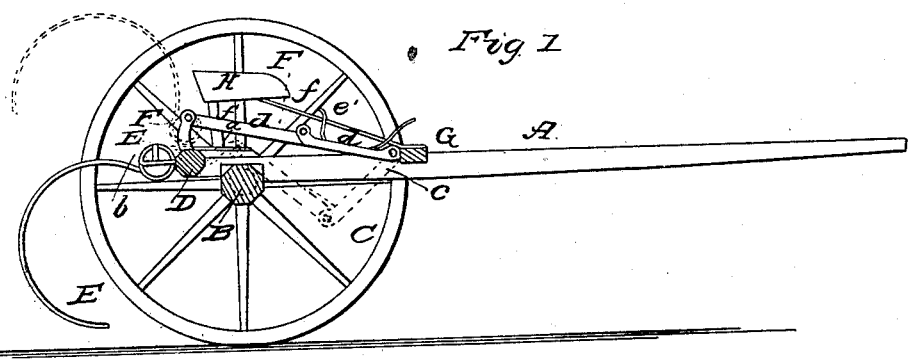
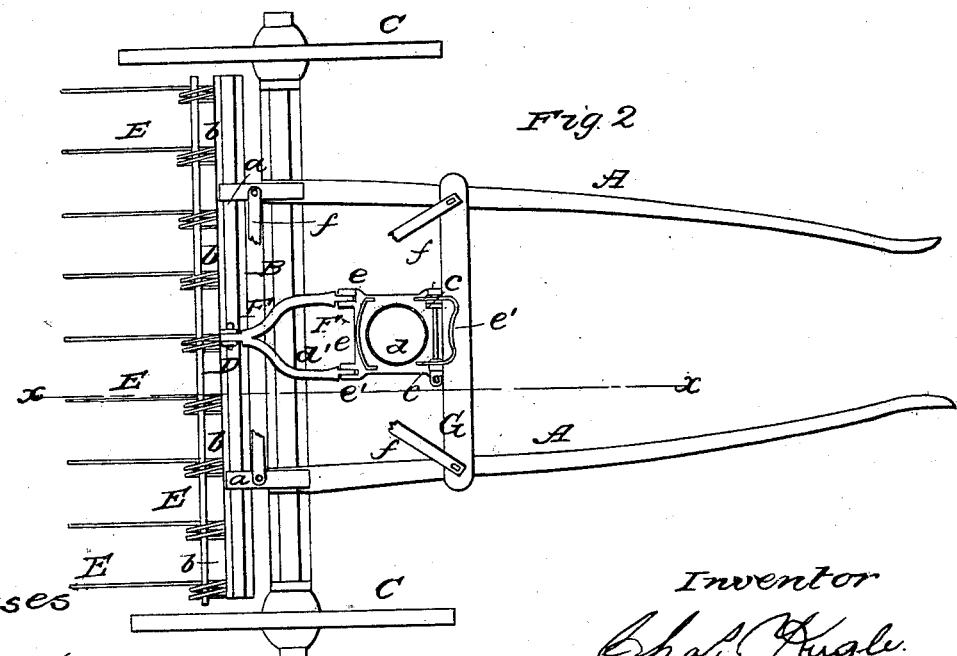
Witnesses
Inventor

UNITED STATES PATENT OFFICE.

CHAS. KUGLER, OF CADIZ, OHIO.

IMPROVEMENT IN HORSE-RAKES.

Specification forming part of Letters Patent No. 57,520, dated August 28, 1866.

*To all whom it may concern:*

Be it known that I, CHARLES KUGLER, of Cadiz, in the county of Harrison and State of Ohio, have invented a new and Improved Horse-Rake; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, Fig. 2. Fig. 2 is a plan or top view of my invention.

Similar letters of reference indicate corresponding parts.

This invention relates to a new and useful improvement in that class of horse-rakes which are provided with wire teeth fitted in a head which turns in suitable bearings.

The invention consists in applying a treadle to the head in such a manner as to counterpoise the teeth and render the rake capable of being raised with the greatest facility, in order that it may discharge its load and still be capable of being held firmly down to its work when required.

A A represent the two thills of the rake, which are secured to an axle, B, having wheels C C at its ends. The rear ends of the thills project a trifle beyond the rear side of the axle, and have metal bearings $a\ a$ attached to them, in which the rake-head D is fitted and allowed to turn freely.

E′ represents the wire rake-teeth, which are fitted in the head D, and are bent so as to have two or more convolutions, $b$, adjoining the head D, and have a rod or bar, E, passing through them.

The rake-head D has a short arm, F, projecting from its center, and to this arm the rear end of a jointed treadle, F*, is attached by a pivot, the front end of said treadle being connected by joints $c$ to a cross-bar, G, of the thills.

The treadle F* is composed of two parts, $d\ d'$, connected by joints, $e^2\ e^2$, forming a kind of toggle, and said treadle may be of iron or other material, and of such a weight as to counterpoise or nearly counterpoise the teeth E of the rake. The front part, $d$, of the treadle has a foot-piece, $e'$, at its front and rear ends.

H represents the driver's seat, which is attached to standards or supports $f$ on the cross-bar G and rear ends of the thills.

When the implement is at work the rake-teeth E are kept down by the driver pressing his feet against the front foot-piece, $e$, of the front part, $d$, of the treadle, the pressure on this foot-piece having a tendency to keep the two parts $d\ d'$ of the treadle in line with each other. When the rake-teeth have gathered up a sufficient load the driver presses down with his feet upon the rear foot-piece, $e'$, and thereby raises the rake-teeth, as shown in red in Fig. 1, so that it will discharge its load.

The rake-teeth descend to their work by a slight pressure against the front foot-piece, $e$.

Thus by this very simple arrangement the rake may be readily raised and lowered at the will of the driver. The parts are extremely few, and the device rendered very simple and not liable to get out of repair.

Having thus described my invention, I claim as new and desire to secure by Letters Patent—

The combination of the jointed parts $d\ d'$, front foot-piece, $e$, rear foot-piece, $e'$, cross-bar G, and arm F of the rake-head D, arranged and operating substantially as described, for the purpose specified.

CHARLES KUGLER.

Witnesses:
CHAS. WARFEL,
AMON LEMMON.